United States Patent [19]

Okano et al.

[11] Patent Number: 5,037,246
[45] Date of Patent: Aug. 6, 1991

[54] PNEUMATIC CONVEYOR FOR GRAINY MATERIAL AND SUCTION NOZZLE FOR USE IN SUCH CONVEYOR

[75] Inventors: Masanori Okano; Tadashi Yoshino, both of Kodama, Japan

[73] Assignee: Eisai Co., Ltd., Tokyo, Japan

[21] Appl. No.: 438,877

[22] Filed: Nov. 20, 1989

[30] Foreign Application Priority Data

Nov. 30, 1988 [JP] Japan .................. 63-303006

[51] Int. Cl.$^5$ .................. B65G 53/42; B65G 53/14
[52] U.S. Cl. .................. 406/152; 406/153; 406/113
[58] Field of Search .................. 406/152, 153, 141, 113

[56] References Cited

U.S. PATENT DOCUMENTS

| | | | |
|---|---|---|---|
| 1,412,977 | 4/1922 | Strong | 406/152 |
| 1,416,013 | 5/1922 | Gieseler | 406/152 |
| 2,301,617 | 11/1942 | Cox et al. | 406/152 |
| 2,419,386 | 4/1947 | Berg | 406/152 |
| 2,831,732 | 4/1958 | Rieser | 406/152 |
| 3,756,659 | 9/1973 | de Koning | 406/152 |
| 3,765,727 | 10/1973 | Santangelo et al. | 406/153 |
| 4,027,407 | 6/1977 | Kiss | 406/153 |

FOREIGN PATENT DOCUMENTS 1406647  6/1964  France .................. 406/153

Primary Examiner—Joseph F. Peters, Jr.
Assistant Examiner—Virna Lissi Mojica
Attorney, Agent, or Firm—Griffin Branigan & Butler

[57] ABSTRACT

A hopper subjected to a suction effect of a vacuum source such as a vacuum pump is connected by a hose to a suction nozzle thrown into a container for grainy material and an ejector is provided to supply the suction nozzle with pressurized air, and thereby a smooth pneumatic conveyance of the grainy material is achieved. A cap laterally provided with openings is slidably put on an open end of the suction nozzle and a total opening area of the lateral openings is adjusted by axially sliding the cap on the open end of the suction nozzle.

8 Claims, 12 Drawing Sheets

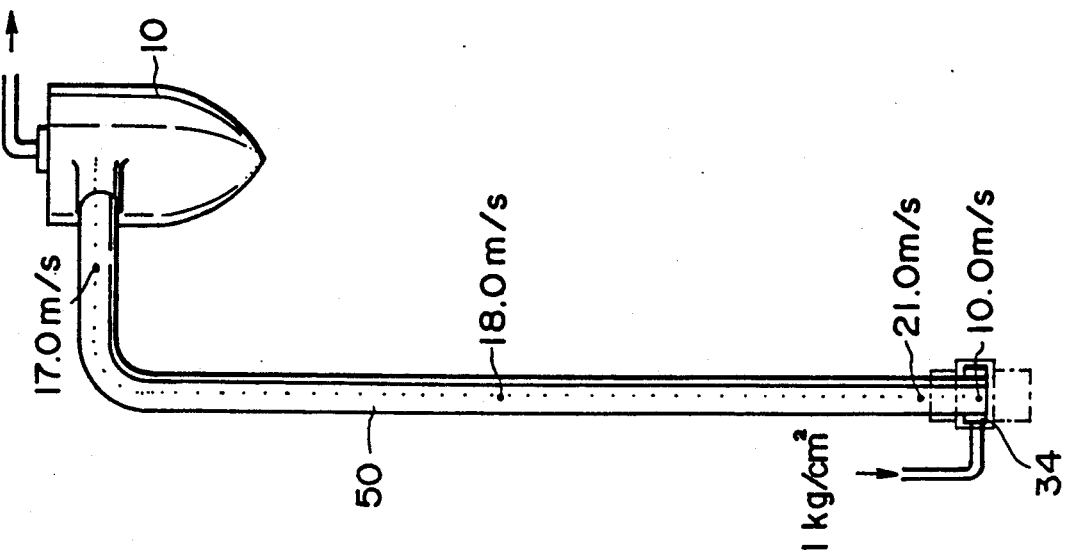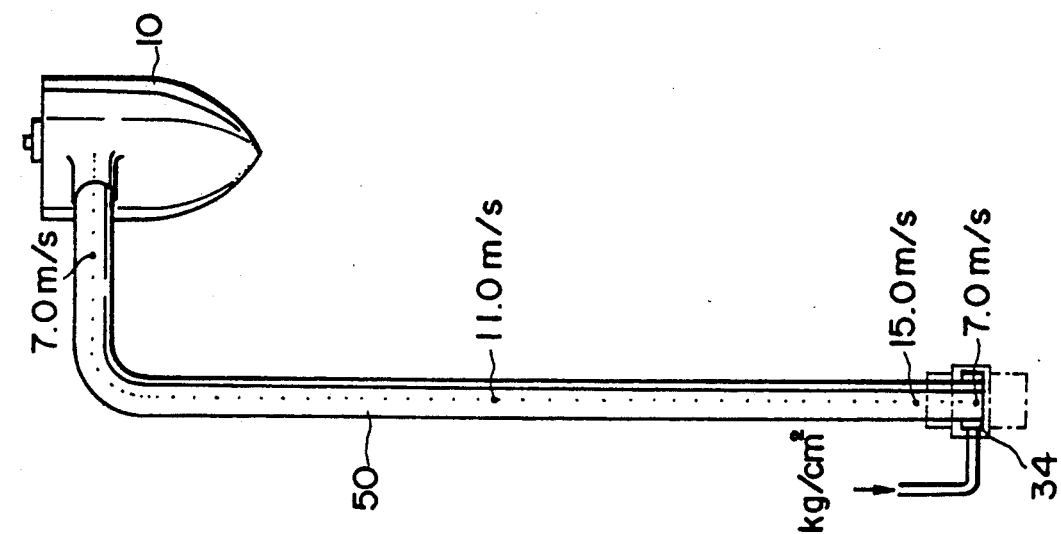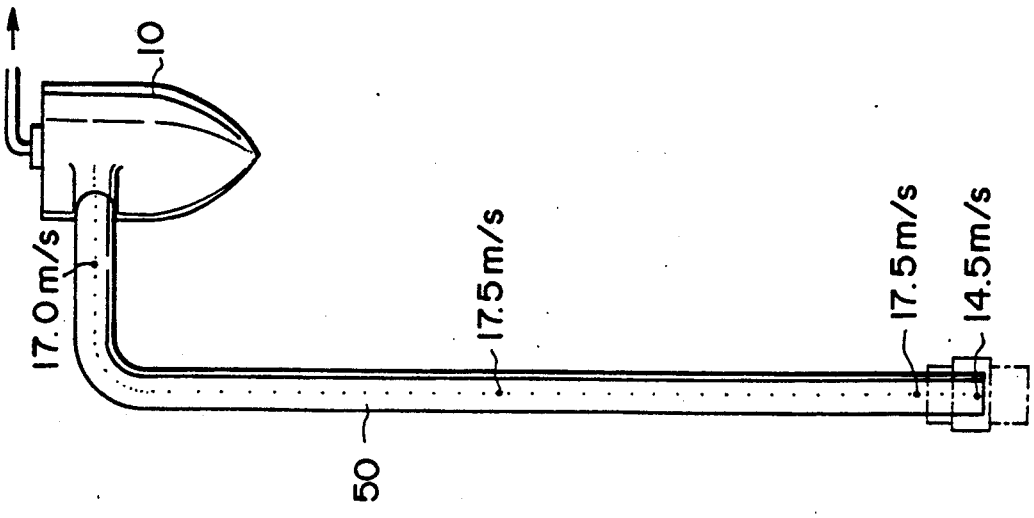

PNEUMATIC CONVEYOR FOR GRAINY MATERIAL AND SUCTION NOZZLE FOR USE IN SUCH CONVEYOR

BACKGROUND OF THE INVENTION

The present invention relates to a pneumatic conveyor adapted for pneumatic shock-free conveyance of grainy materials such as tablets or capsulated pill and further to a suction nozzle used in such conveyor.

The pneumatic conveyors for grainy materials of prior art are generally classified into two types, one relying upon a suction effect of a vacuum pump for conveyance of the grainy materials and the other relying upon a pressurized air introduced into a sealed container which contains a batch of the grainy materials so that these grainy materials may be conveyed from the container batch by batch.

The former method of prior art which relies upon the suction effect of the vacuum pump for conveyance of the tablets is disclosed by Japanese Disclosure Gazette No. 1981-113615, according to which a tablet suction duct (hose) is connected to a sealed container and the latter is decompressed by a vacuum pump. However, too many tablets are sucked at once through a front end of the suction duct and immediately a blocking occurs within the suction duct.

Upon occurrence of such block, a negative pressure at the vacuum side rapidly increases and said blocking collapses, with a result that the tablets are sucked at once through the suction duct. Thus, the suction is unstable and the tablets intensely collide with one another.

Certainly, the negative pressure at the vacuum side and, therefore, a velocity of the air flow may be increased to avoid said blocking. However, this would inconveniently increase the inertial force of the tablets and also the shock generated when the tablets collide with one another and with the equipment walls.

In any case, the conventional method utilizing the suction effect of the vacuum pump is apt to damage the tablets and to yield a certain percentage of unacceptable product.

The latter method of prior art comprising steps of sealing the container filled with the tablets or the like and supplying a pressurized air into the sealed container so as to convey the tablets or the like from the container batch by batch is disclosed by Japanese Disclosure Gazette No. 1987-264122, according to which the tablets fed from a hopper into an air-tight storage container through a valve mounted in a top wall thereof, said valve being opened at this moment, and then said storage container is supplied from an air supplying pipe with a pressurized air with said valve being closed to convey the tablets from the container through another conveyance pipe. With such method relying the pressurized air, a next supply of the tablets from the hopper must be stopped and the air-tight storage container already filled with the tablets must be sealed for every conveyance. Thus, the conveyance occurs batch by batch and any continuous operation is impossible.

Furthermore, there must be provided a valve serving to seal the container filled with the tablets or the like for every batch handling and, in consequence, peripheral device of the conveyor must be complicated, correspondingly increasing a total cost.

Moreover, this conveyor of prior art uses a stainless piping (i.e., piping of sanitary type) which necessarily restricts a degree of freedom and correspondingly makes maintenance such as cleaning rather difficult.

SUMMARY OF THE INVENTION

An object of the present invention is to provide a pneumatic conveyor for grainy material, utilizing the grainy material conveying method under the suction effect of the vacuum pump so combined with the grainy material conveying method under the effect of the pressurized air that the grainy material to be conveyed is free from blocking during operation of the conveyor in spite of its relatively simple structure.

This object is achieved, in accordance with the present invention, by a pneumatic conveyor for grainy material, comprising a vacuum source such as vacuum pump, a hopper subjected to a suction effect of said vacuum source, a suction nozzle connected by a hose to said hopper and thrown into the grainy material, and an ejector serving to supply said suction nozzle with a pressurized air.

In such pneumatic conveyor, the inner surface of the hopper is preferably formed by buffer material to protect the grainy material against damage. Useful buffer material includes Neoprene rubber, urethane foam, Teflon and urethane rubber, all having sufficient shock absorbing ability.

Preferably, the hose is tangentially mounted on the side wall of the hopper so that the grainy material may spirally fall within the hopper.

A nozzle of the ejector is preferably so curved that a jet of pressurized air may flow along the inner wall of the hose.

Another object of the present invention is to provide a suction nozzle for use in the pneumatic conveyor for grainy material serving to prevent the grainy material from blocking during operation of the conveyor.

According to the present invention, this object is achieved by a suction nozzle for use in the pneumatic conveyor for grainy material, comprising a cap laterally provided with openings and slidably mounted around an open end of the suction nozzle so that said cap may be axially slided on said open end to vary a total opening area of said lateral openings and thereby to adjust a suction capacity for the grainy material.

In such suction nozzle, the cap is preferably of a dual structure consisting of an outer cap and an inner cap which may be relatively rotated to vary said total opening area. The suction nozzle is preferably provided in its front end with air jet ports so that lumps of the grainy material may collapse under air jet streams provided from these air jet ports. Preferably, the suction nozzle is provided at locations corresponding to the respective lateral openings of the cap with air suction perforations in order to maintain gaps or spaces among the individual grains being sucked.

The present invention provides effects as set forth below:

A. The vacuum suction effect is combined with the pressurized air of a predetermined level supplied from the ejector nozzle so as to avoid occurrence of blocking within the hose;

B. The cap laterally provided with openings is slidably mounted around the open end of the suction nozzle so that said cap may be axially slided on said open end to vary a total opening area of said lateral openings and thereby to adjust a suction capacity for the grainy material. In this manner, even if the suction nozzle has been embedded in a mass of tablets, the tablets are continuously sucked and conveyed without occurrence of blocking within the open end of the suction nozzle.

C. The tablets are progressively decelerated as they ascend through the hose, thus conveyed at a relatively low velocity into the hopper so as not to damage the tablets colliding with one another so that the pneumatic conveyor of the present invention can convey the brittle or fragile grainy material such as capsulated or sugar-coated tablets.

D. After deenergization of the vacuum source, the tablets remaining within the hose fall at a relatively slow velocity because the pressurized air continues to be supplied and decelerates the velocity at which the tablets fall through the hose;

E. Combination of the vacuum suction and the ejector makes operation easier. The container for the grainy material into which the suction nozzle is thrown requires no sealing means and correspondingly an extremely compact equipment is obtained;

F. Even in the case of conveyance from a large-sized hopper, conveyance can be smoothly performed because of such simplified equipment; and G. The hose made of polyethylene or the like will achieve a high degree of freedom in the maintenance such as cleaning.

BRIEF DESCRIPTION OF THE DRAWINGS

The above and other objects of the invention will be seen in reference to the description taken in connection with the accompanying drawings, in which:

FIGS. 8A, 8B and 8C are illustrative diagrams for EXPERIMENT B;

DETAILED DESCRIPTION OF THE INVENTION

While the invention will be described with respect to tablets as an example of the grainy material, it should be understood that the invention is applicable also to the other types of grainy materials such as capsulated pill, small-sized confectionery and other grains.

Figure 1:
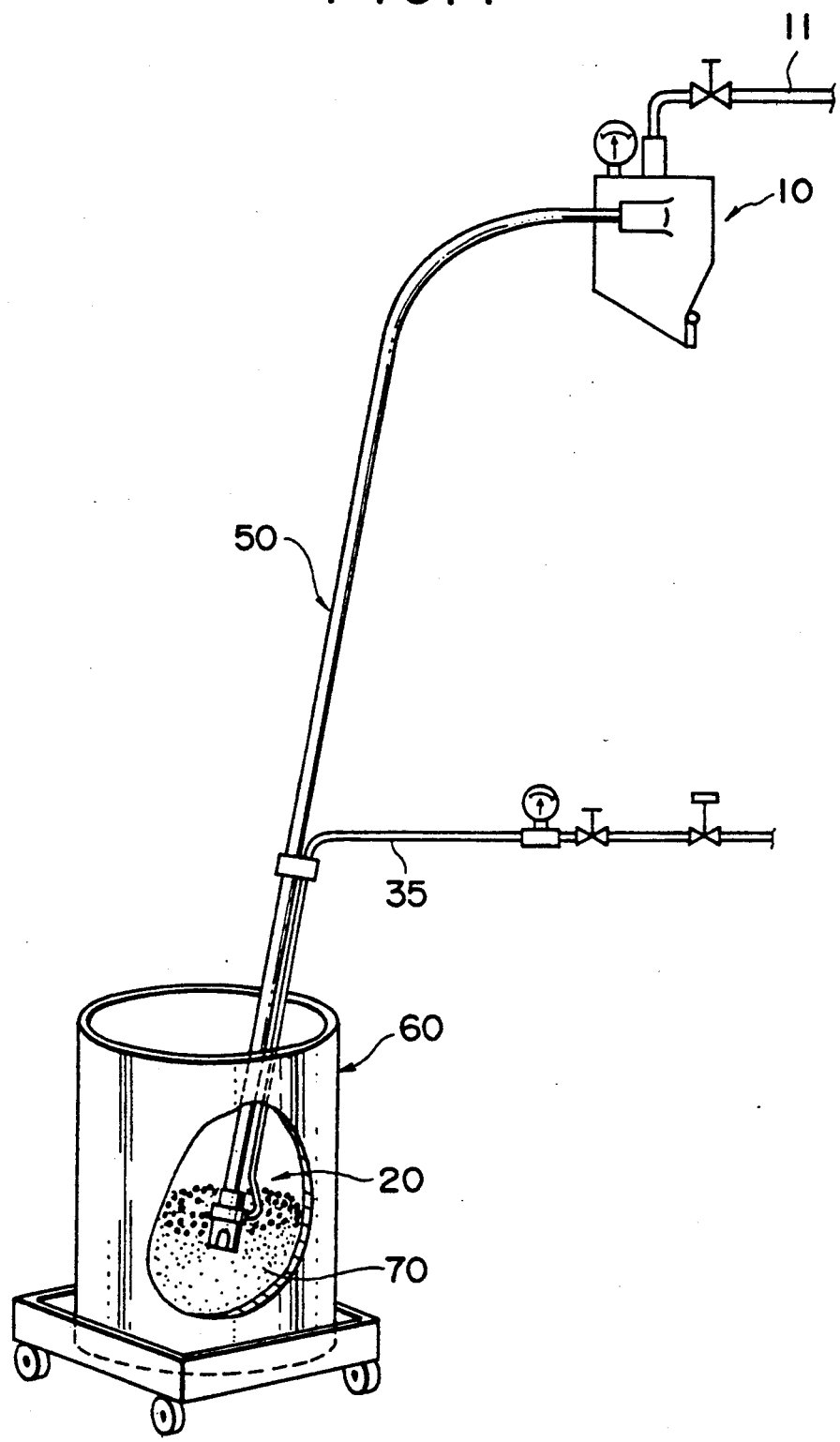
FIG. 1 is a perspective view showing a pneumatic conveyor for grainy material constructed in accordance with the present invention.

FIG. 1 illustrates an entire pneumatic conveyor of the invention comprising a hopper 10, a container 60 containing therein tablets 70, a suction nozzle 20 thrown into said container 60, a gas supplying pipe 35 adapted to supply said suction nozzle 20 with pressurized air, and a hose 50 connecting said hopper 10 with said suction nozzle 20. The hose 50 is preferably made of wired Tetoron.

Figure 2A:
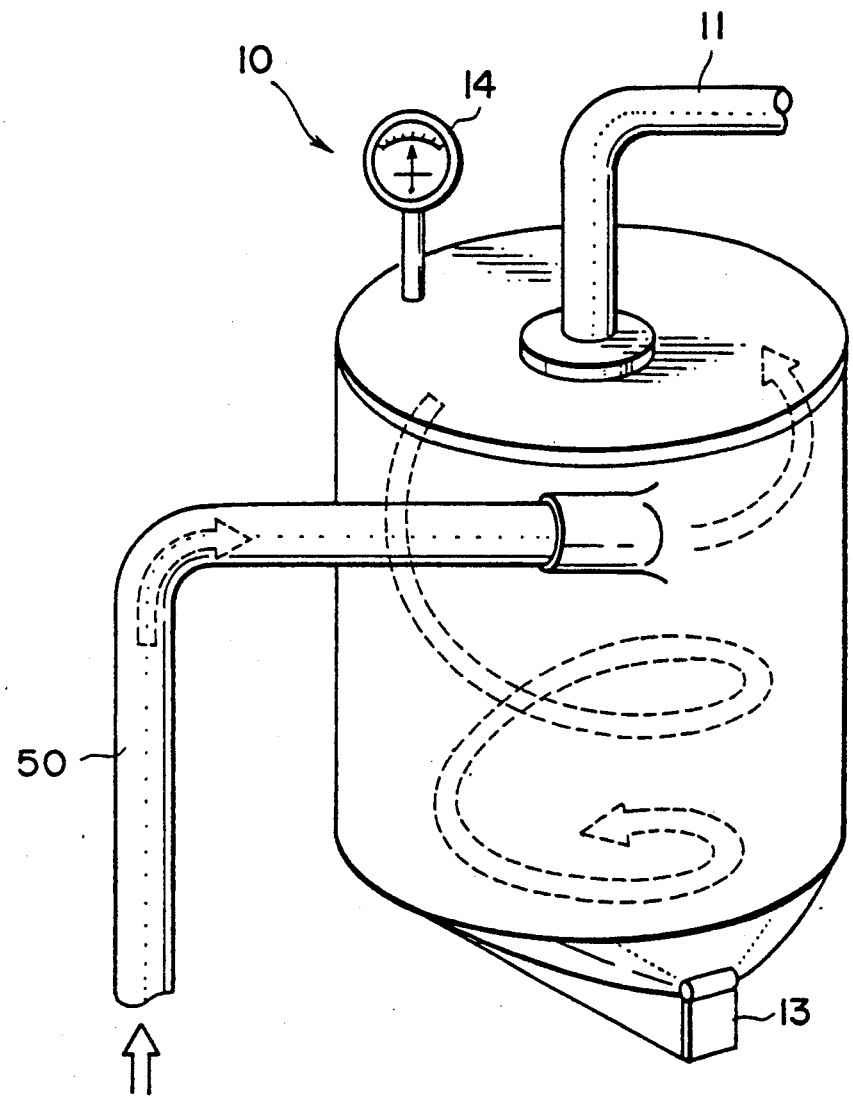
FIGS. 2A and 2B illustrate a hopper of the invention in perspective and sectional views, respectively.
Figure 2B:
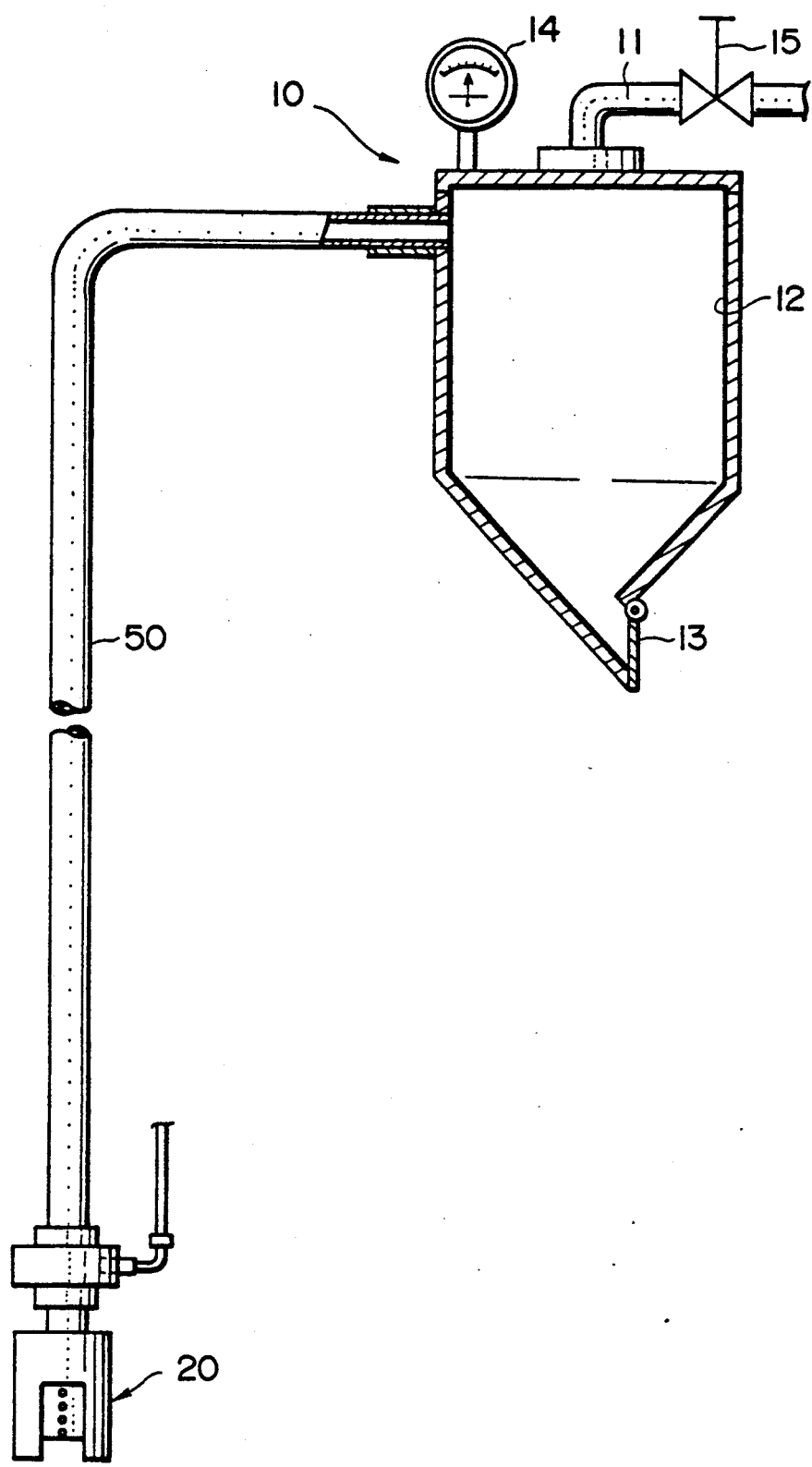

Referring to FIGS. 2A and 2B, a suction pipe 11 is connected with the hopper 10 so that the interior of said hopper 10 is decompressed under operation of a vacuum source such as a vacuum pump (not shown) and thereby the tablets 70 are sucked up through the hose 50.

Inner wall of the hopper 10 is coated with suitable buffer material 12 to alleviate undesirable shock which would otherwise be generated when the tablets strike against the inner wall as they are sucked up.

The hopper 10 has a shutter 13 pivotally mounted on a lower end thereof. Reference numeral 14 designates a static pressure gauge and reference numeral 15 designates a valve used to shut the suction pipe 11.

The hose 50 is tangentially mounted on the side wall of the hopper 10, as shown by FIG. 2A, so that the tablets 70 being sucked up through the hose 50 spirally descend along the inner wall of the hopper under a decelerating effect and are accumulated on a bottom of the hopper 10.

Upon deenergization (in response to a timer or the like) of the vacuum pump after a predetermined quantity of tablets has been accumulated in the hopper 10, the shutter 13 is pushed open by a weight of the tablets themselves 70 and thereby the tablets 70 are discharged downwards.

FIG. 3 shows a first embodiment of the suction nozzle 20 provided according to the present invention, which comprises a main body 30, an upper portion 31 connected by bolts 33 to said main body 30 and an ejector 34 provided in said upper portion 31.

The upper portion 31 receives the rear end of the main body 30 so as to define between the inner wall of the upper portion 31 and the outer periphery of the main body 30 said ejector 34 which comprises, in turn, an annular ejector passage 34a and an annular tapered ejector nozzle 34b so that a quantity of pressurized air supplied through the gas supplying pipe 35 is fed into said annular ejector passage 34a and then fed through said ejector nozzle 34b into a cavity within the upper portion 31.

With the suction nozzle of the present invention which comprises the ejector in this manner, not only the grains, in general, are accelerated along the ejector but also are always supplied, as they flow through the ejector, to the hose, with an adequate quantity of air to maintain suitable gaps or spaces among the individual grains, and thereby to avoid an occurrence of blocking within the hose.

The main body 30 of the suction nozzle has a tablet suction port 36 opening at a front end thereof, through which the tablets 70 are sucked. The main body 30 is further provided through the side wall 30a thereof with a plurality of air suction perforations 37 used to maintain the above-mentioned gaps or spaces among the individual tablets 70 which have been sucked through the tablets suction port 36. More specifically, if many tablets are present at the tablet suction port 36 in suction of these tablets, the quantity of air will be in short supply. To remedy such shortage, a supplementary quantity of air may be sucked through the air suction perforations 37 to maintain the gaps or spaces among the tablets being sucked.

The upper portion 31 of the suction nozzle is connected to the hose 50. O-rings 38, 38 are used for leak prevention as well as fixation of the hose 50.

The suction nozzle 20 constructed as has been mentioned above is provided at its front end with a cap 40 mounted thereon in axially slidable manner.

The cap 40 is formed with openings 41 of which the total area varies as the cap 40 is axially slid. Each of these openings 41 is L-shaped as viewed in its axial section, consisting of a side portion 41a and a bottom portion 41b both being substantially rectangular.

Figure 3A:
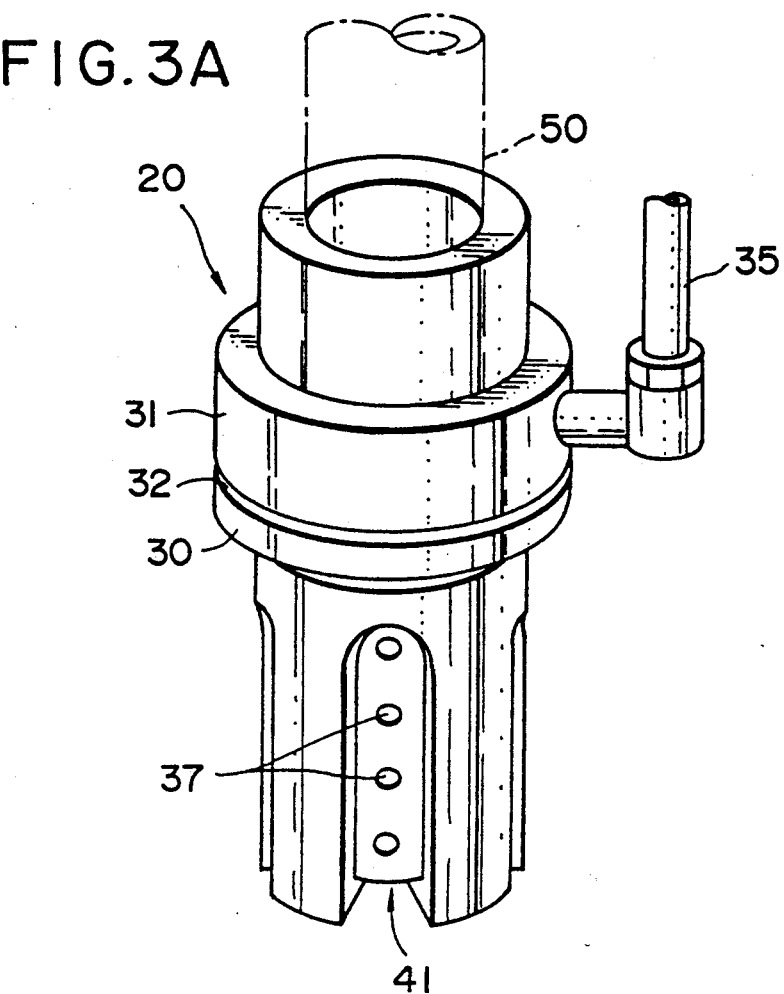
FIGS. 3A and 3B illustrate a first embodiment of the suction nozzle constructed according to the invention in perspective and frontal views, respectively, FIGS. 3C and 3D being both sectional views corresponding to FIG. 3A.
Figure 3B:
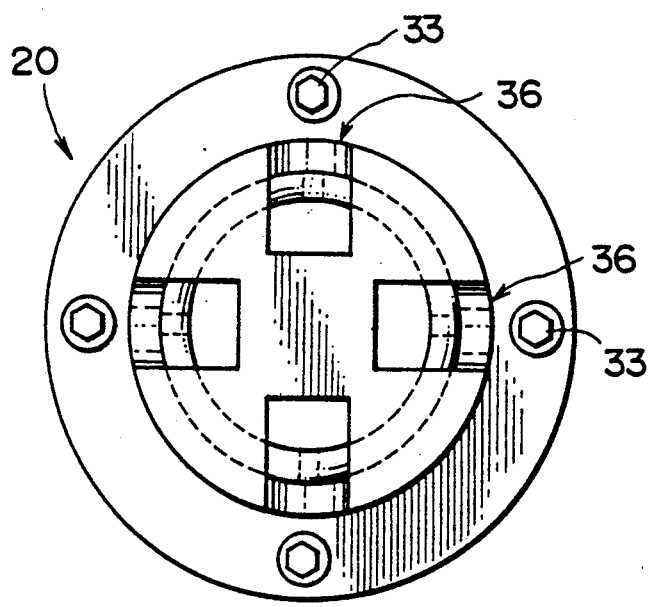
Figure 3C:
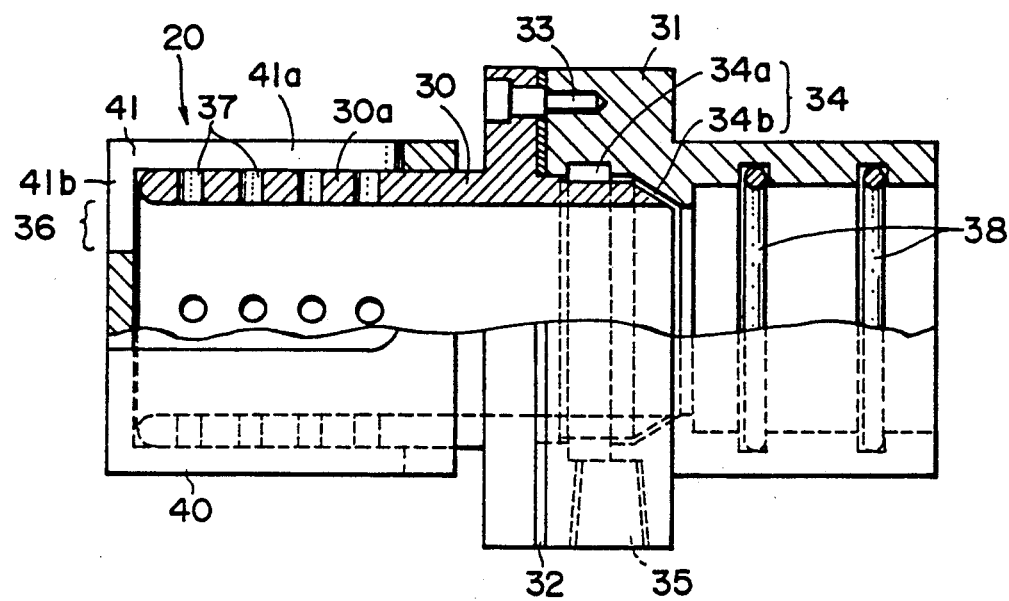

Specifically, when the cap 40 has been slided to the rearmost position on the suction nozzle 20 as seen in FIG. 3C, said side portions 41a of the respective openings 41 are entirely covered by the side wall 30a of the suction nozzle's main body 30, resulting in the minimum opening area provided only by the bottom portions 41b.

Figure 3D:
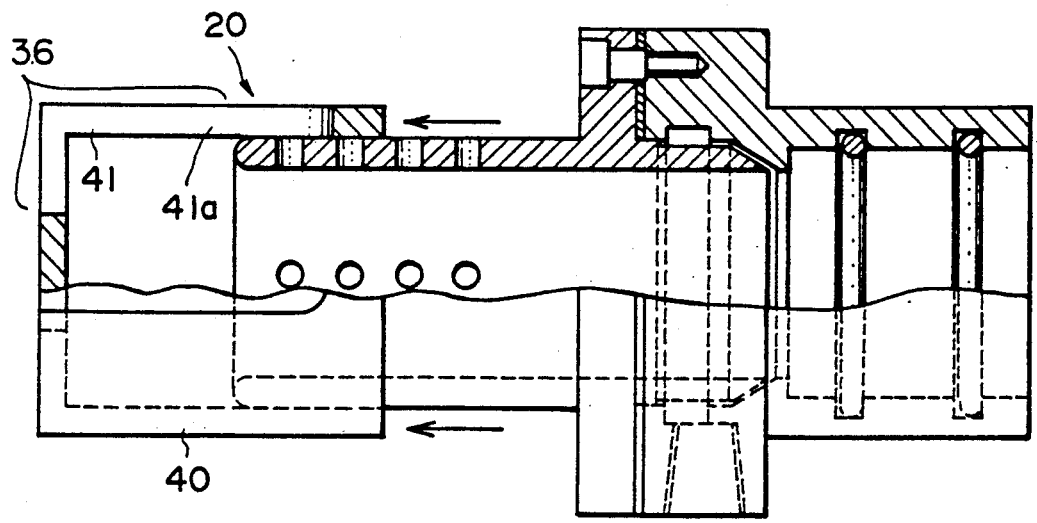

On the contrary, the side portions 41a of the respective openings 41 are progressively opened and the total opening area is enlarged, as the cap 40 is slided forward (in the direction indicated by arrows) as seen in FIG. 3D.

In this manner, a suction capacity of the suction nozzle 20 can be adjusted by axially sliding the cap 40, e.g., for relatively larger tablets 70, the cap 20 is slided forward to enlarge the opening area while for relatively small tablets 70, the cap 20 is rearward, and thereby the tablets 70 are prevented from blocking in the opening of the suction nozzle.

Figure 4A:
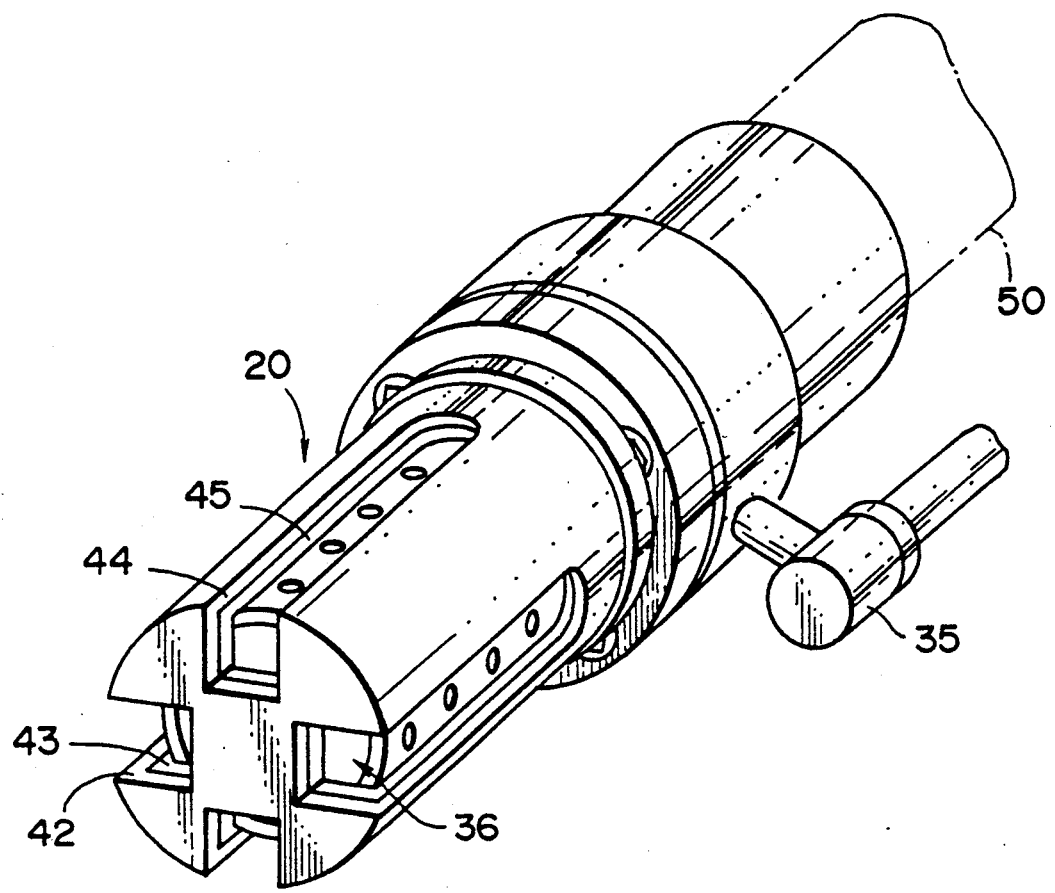
FIGS. 4A, 4B and 4C illustrate a second embodiment of the suction nozzle constructed according to the invention in a perspective view, in a side view partially in section, and in a frontal view, respectively.
Figure 4B:
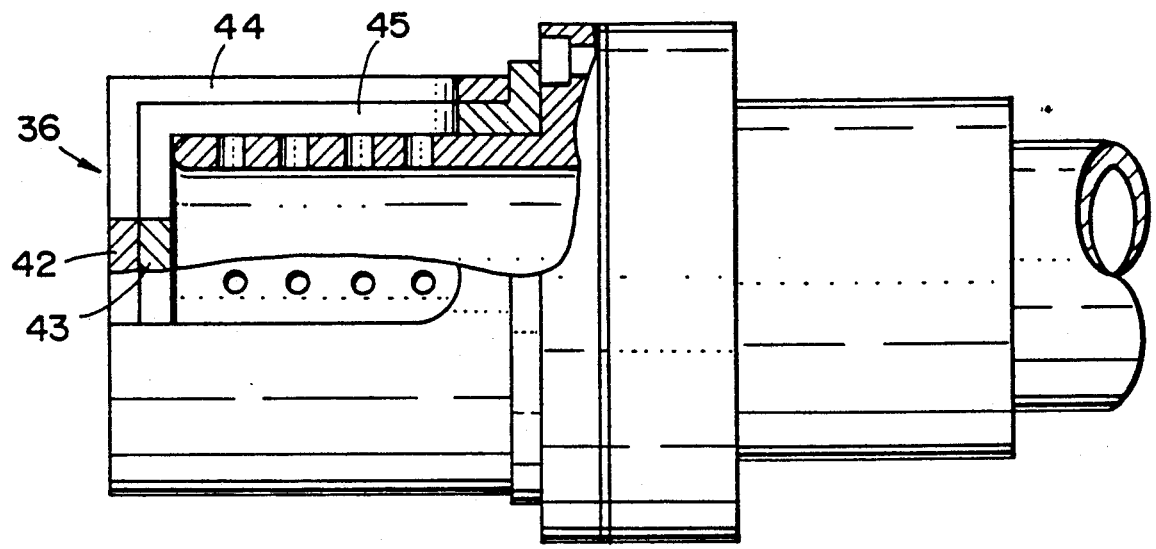
Figure 4C:
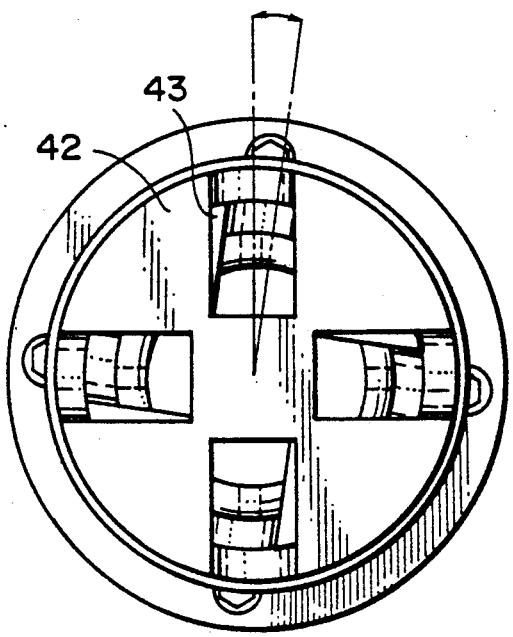

FIGS. 4A, 4B and 4C show a second embodiment of the suction nozzle 20 constructed in accordance with the present invention, in which the cap 40 is of a dual structure consisting of an outer cap 42 and an inner cap 43.

These outer cap 42 and inner cap 43 are respectively provided with openings 44, 45 of a same size so that the opening area of the tablet suction port 36 may be reduced by relatively rotating the outer cap 42 and the inner cap 43 (See FIG. 4C).

Such arrangement allows the opening area of the tablet suction port 36 to be finely adjusted.

Figure 5:
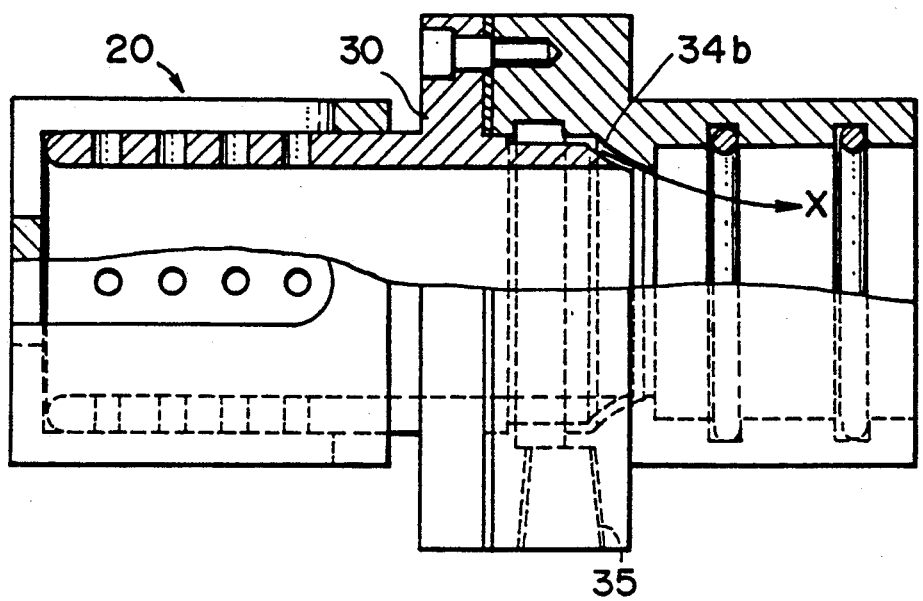
FIG. 5 is a side view illustrating a third embodiment of the suction nozzle constructed according to the invention partially in section.

FIG. 5 shows a third embodiment of the suction nozzle 20 constructed according to the present invention, in which the ejector nozzle 34b defined between the inner surface of the suction nozzle's upper portion 31 and the outer peripheral surface of the suction nozzle's main body 30 around the rear end thereof is inwardly curved so as to force the pressurized air supplied from the gas supplying pipe 35 in a streamline direction.

The pressurized air supplied through this curved ejector nozzle 34b forms an air stream flowing substantially along the inner surface of the hose 50, as indicated by an arrow x, and this assists formation of a laminar flow within the hose 50.

Thus, a possibility of grainy material blocking within the hose is effectively reduced.

Figure 6A:
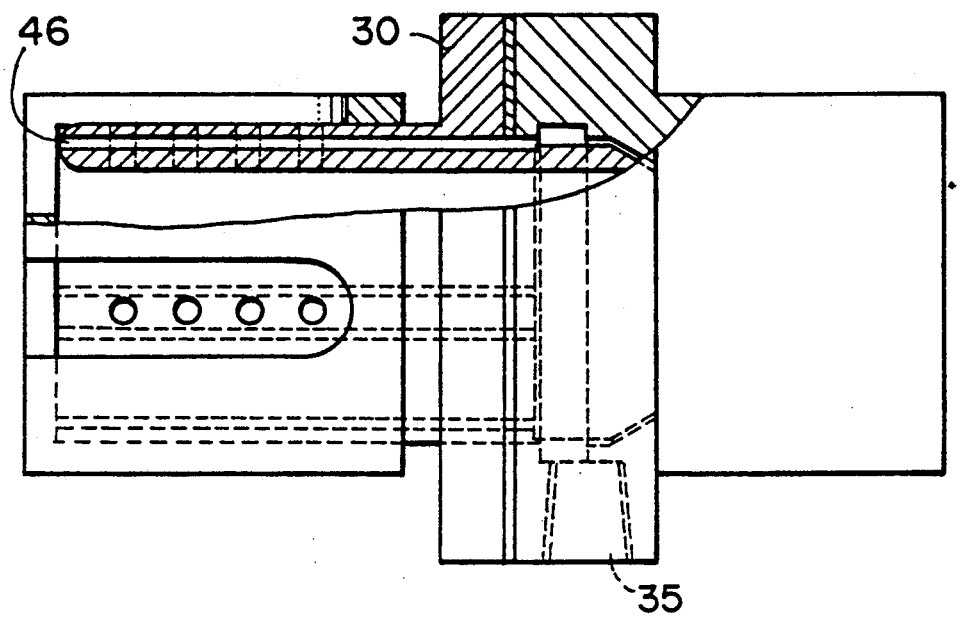
FIG. 6A and 6B illustrate a fourth embodiment of the suction nozzle constructed according to the invention in a side view partially in section and in a frontal view, respectively.
Figure 6B:
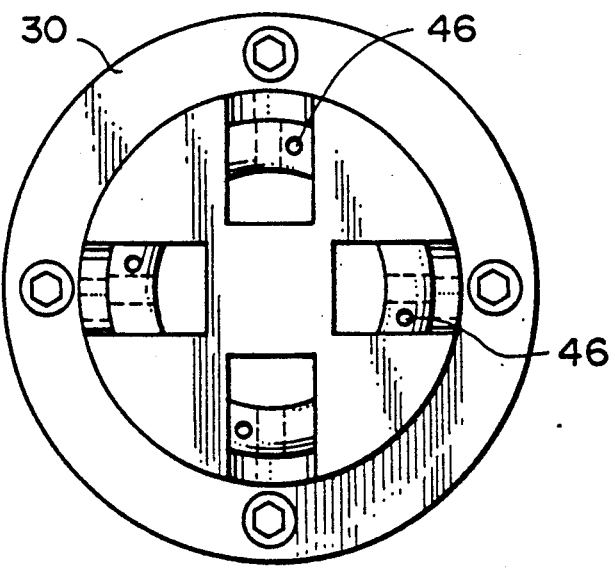

FIGS. 6A and 6B show a fourth embodiment of the suction nozzle 20 constructed according to the present invention, in which the main body 30 of the suction nozzle 20 is provided at its front end with air jet ports 46 so that the pressurized air supplied from the gas supplying pipe 35 into the annular ejector passage 34a may be then partially introduced into these air jet ports 46.

Sugar-coated tablets or the like sometimes stick to one another to form lumps, but these lumps are taken apart again to the individual tablets 70 under the air jet provided from said air jet ports 46 and thereby suction of the tablets 70 can be smoothly carried out.

In the pneumatic conveyor constructed in accordance with the present invention as has been mentioned above, the tablets 70 are continuously sucked through the suction nozzle 20 thrown into the container 60 for said tablets 70 by evacuating the hopper 10 under the effect of the vacuum source such as the vacuum pump (not shown). During this suction, the cap 40 may be axially slided on the suction nozzle 20 to change the opening area and thereby to adjust the suction capacity to a desired level. The tablets are maintained apart from one another, since the tablets being sucked are accelerated along the ejector section of the suction nozzle 20 with a plenty of air.

The tablets 70 are progressively decelerated as they ascend through the hose 50, thus conveyed at a relatively low velocity into the hopper 10, then spirally descend along the inner wall of the hopper 10 and accumulated on the bottom of the hopper 10. The progressive deceleration of the tablets 70 occurring as they ascend through the hose 50 is believed to be due to a fact that the hose 50 and the hopper 10 are supplied with a part of the pressurized air supplied from the ejector and thereby a static pressure within the hose 50 is lowered.

Upon deenergization of the vacuum source such as the vacuum pump after a predetermined quantity of tablets has been accumulated in the hopper 10, the shutter 13 is pushed open by a weight of the tablets themselves 70 and thereby the tablets 70 are discharged downward.

Thus, no blocking of the tablets 70 occurs within the hose 50.

With the conventional tablet conveying method utilizing the suction effect of the vacuum pump, when the hopper is evacuated by the vacuum pump, a plenty of tablets are sucked up into the suction nozzle at once, resulting in blocking. This, in turn, sharply enhances a vacuum level within the hopper and the blocking collapses under the resulting negative pressure.

Collapse of such blocking causes the tablets which have been in the blocking condition to be sucked up through the hose at once and the suction nozzle sucks a new mass of the tablets, resulting in blocking again. This is repeated.

Therefore, it has usually been impossible for the pneumatic conveyor of prior art to convey the grainy material which is brittle or fragile such as capsulated or sugar-coated tablets.

The present invention solves such technical problems encountered by the pneumatic conveyor of well known art by providing the suction nozzle with the unique ejector.

Various experiments conducted for development of this invention will be described below.

EXPERIMENT A

Figure 7A:
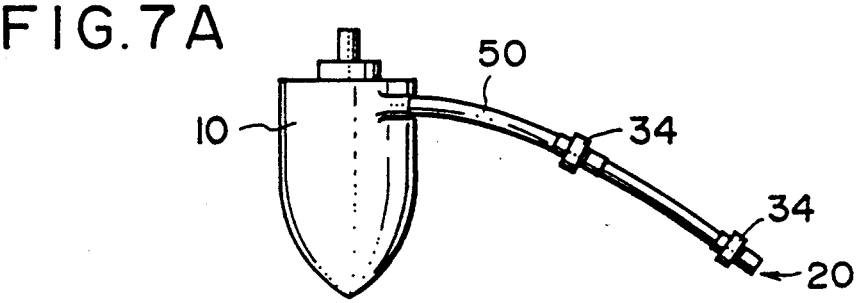
FIGS. 7A, 7B and 7C are illustrative diagrams for EXPERIMENT A.
Figure 7B:
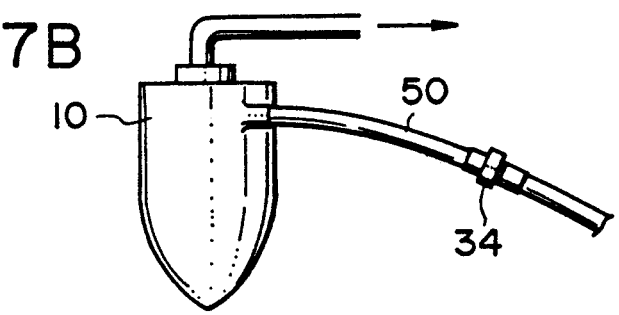
Figure 7C:
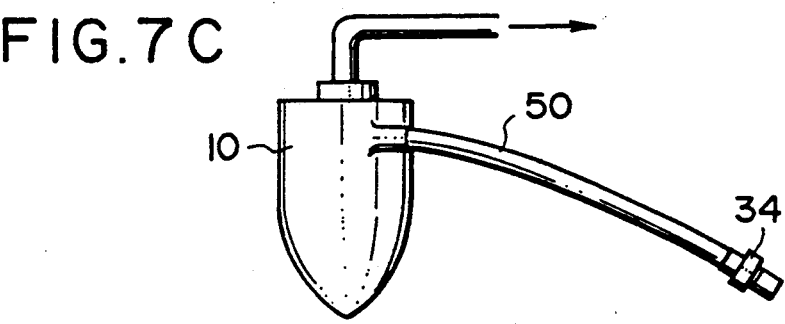

Efficiency of tablet conveyance was examined in relation to the position at which the ejector 34 is selectively mounted (See FIGS. 7A, 7B and 7C).

1. FIG. 7A shows the case in which a pair of the ejectors 34 were mounted on the suction nozzle 20 and on the hose 50 at an intermediate position therealong, respectively. First, the pressurized air of 4 kg/cm$^2$ and then the pressurized air of 6 kg/cm² were supplied from these ejectors 34 without evacuation of the hopper by the vacuum pump.

This experiment indicated that no conveyance of the tablets was achieved in any case. Accordingly it was found that the pressurized air higher than .SRO 6 kg/cm² must be supplied in order to achieve desired conveyance only under the effect of pressurized air.

2. FIG. 7B shows the case in which a single ejector 34 was mounted on the hose 50 at an intermediate position therealong and the hopper 10 was evacuated by the vacuum pump.

It was found from this experiment that the pressurized air supplied from the ejector was apt to flow backward and, in consequence, the tablets were not conveyed.

3. FIG. 7C shows the case in which a single ejector 34 was mounted on the suction nozzle and the hopper 10 was evacuated by the vacuum pump. More specifically, the degree of vacuum within the hopper 10 was enhanced to a level at which the conveyance of the tablets can be achieved only under the suction effect and then the pressurized air of 1 kg/cm² was supplied from the ejector 34.

It was found from this experiment that the tablets can be buoyantly conveyed through the hose.

EXPERIMENT B

Air flow velocity within the hose 50 was measured under various conditions as following (See FIGS. 8A, 8B and 8C). It should be understood that such measurement was conducted at a position closely adjacent the suction nozzle 20, at a position along the hose 50 slightly above said position, at an intermediate position along the hose 50, and at a position adjacent the inlet of the hopper 10.

1. FIG. 8A shows the case in which the hopper 10 was subjected to the suction effect of the vacuum pump but no pressurized air was supplied from the suction nozzle.

2. FIG. 8B shows the case in which the hopper 10 was not subjected to the suction effect of the vacuum pump and the pressurized air of 1 kg/cm² was supplied from the ejector 34 carried on the suction nozzle.

3. FIG. 8C shows the case in which the hopper 10 was subjected to the suction effect of the vacuum pump and the pressurized air of 1 kg/cm² was supplied from the ejector 34 carried on the suction nozzle.

It was found from this experiment that the flow velocity is relatively high on the average at any position in the case of FIG. 8A but relatively low on the average at any position in the case of FIG. 8B. The experiment revealed also that, in the case of FIG. 8C, the flow velocity is relatively low at a position closely adjacent the suction nozzle but is sharply accelerated from the position adjacent the ejector nozzle and then decelerated toward the position adjacent the inlet of the hopper 10.

Figure 9A:
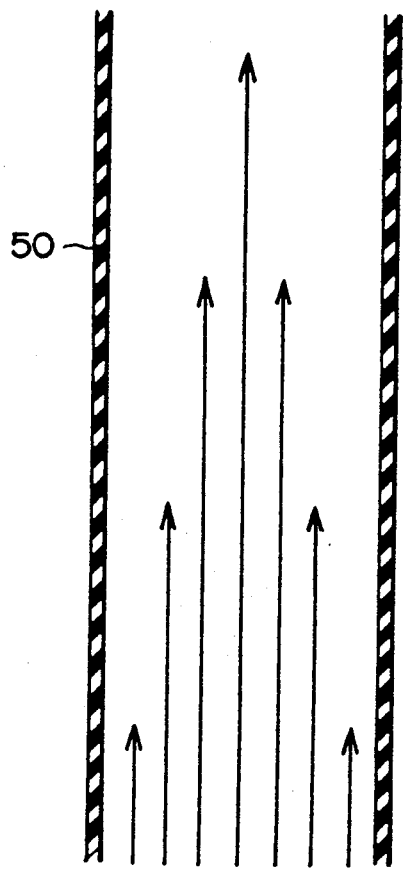
FIGS. 9A and 9B are illustrative diagrams illustrating flow velocity distribution within the hose 50 in the case of conveyance by a suction effect of the vacuum pump and a pressurized air, respectively.
Figure 9B:
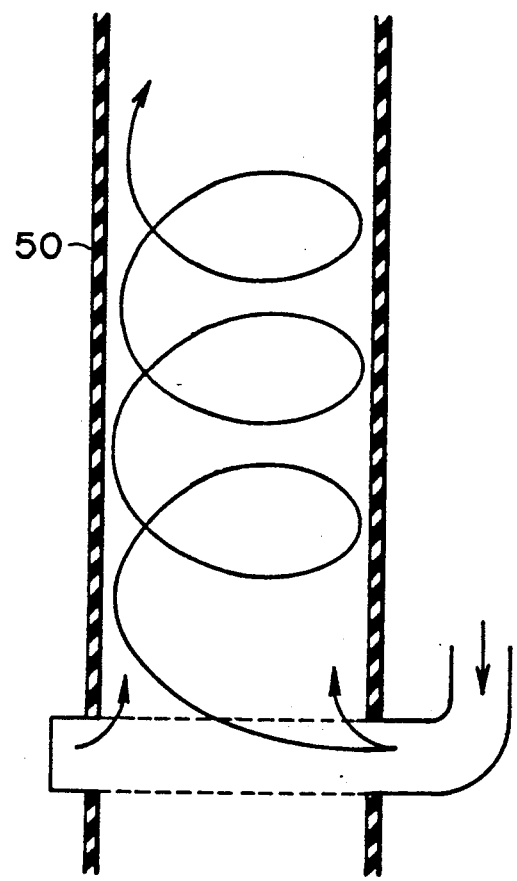

Observation of such flow velocity distribution revealed that nearer the central axis of the hose 50, higher the flow velocity when the conveyance relied only upon the suction effect of the vacuum pump (See FIG. 9A), and that the spiral flow is established within the hose 50 when the conveyance relied only upon the pressurized air (See FIG. 9B).

Stabilization of the flow was observed within the hose 50 when the conveyance relied upon both the suction effect of the vacuum pump and the pressurized air.

EXPERIMENT C

The suction nozzles of various configuration were prepared to examine occurrence of blocking (See FIGS. 10A through 10D).

Figure 10A:
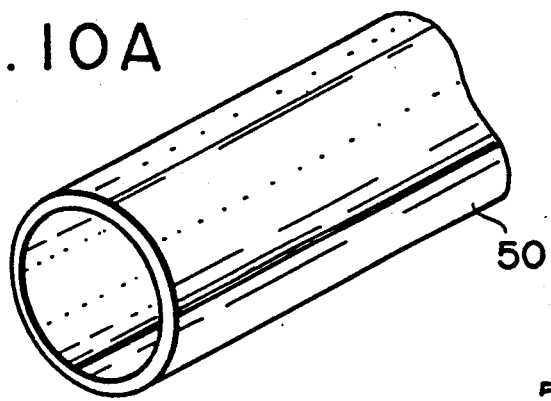
FIGS. 10A, 10B, 10C and 10D are illustrative diagrams for EXPERIMENT C.

1. FIG. 10A shows the case in which the hose 50 provided with no additional technical means was used.

It was found that the tablets being sucked caused blocking.

Figure 10B:
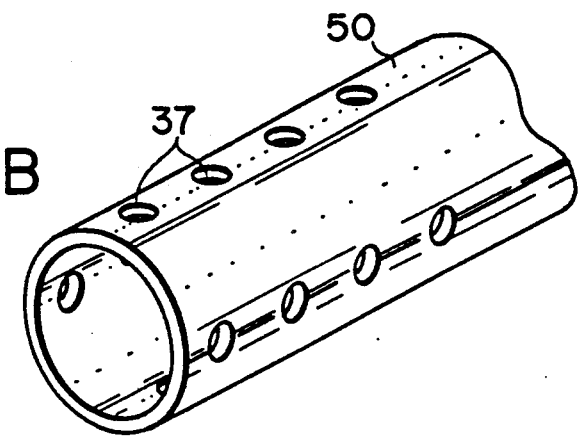

2. FIG. 10B shows the case in which the hose 50 laterally provided with a plurality of air suction perforations 37 was used.

It was found that a possibility of blocking is reduced because a quantity of air is sucked through those air suction perforations 37 but occurrence of blocking is similar to the case of FIG. 10A so far as the open end of the hose 50 having no perforations is concerned, since the open end of the hose 50 tends to suck a plenty of tablets at once.

Figure 10C:
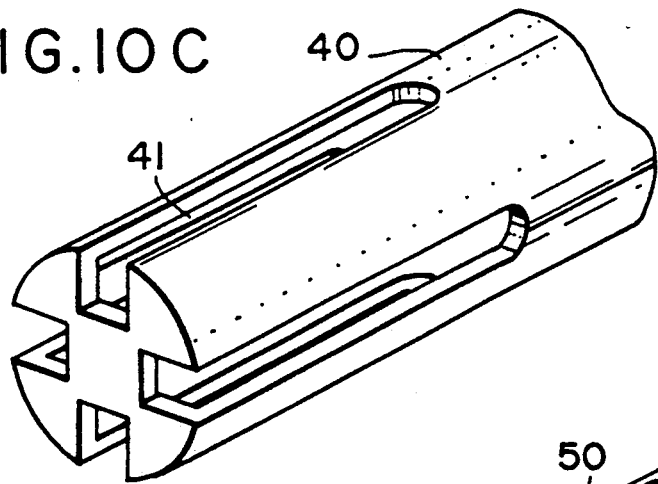

3. FIG. 10C shows the case in which the cap 40 provided with the openings 41 but these openings were not covered by the suction nozzle's main body, as in the present invention.

It was observed that the total opening area of said openings is too large because they are not covered by the suction nozzle's main body and, as a result, these openings tend to suck a plenty of tablets at once, causing blocking.

Figure 10D:
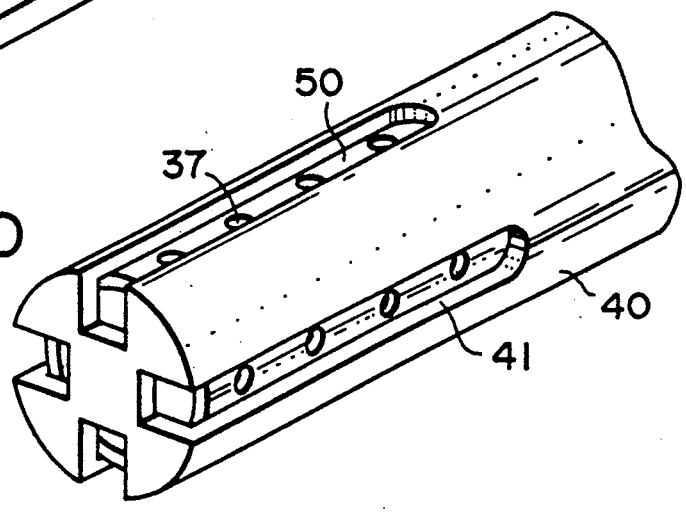

4. FIG. 10D shows the case in which the hose 50 is provided with the cap 40 being axially slidable on the hose 50 to adjust the opening area and the locations of the hose corresponding to the respective openings 41 of the cap 40 are provided with the air suction perforations 37.

It was found that the suction is smoothly achieved without occurrence of blocking.

EXPERIMENT D

Actual tablets were used to examine the conveying efficiency.

This experiment revealed that the number of unacceptable tablets per 120,000 tablets is zero as a result of the suction conveyance under a suction effect of 17 to 20 kg and a pressurized air of 1 kg according to the present invention and the conveyance relying only upon the suction effect yields 10 unacceptable tablets per 120,000 tablets.

While the invention has been particularly shown and described with reference to preferred embodiment thereof, it will be understood by those skilled in the art that the foregoing and other changes in form and details can be made therein without departing from the spirit and scope of the invention.

What is claimed is:

1. In a pneumatic conveyor for grainy material having a hopper, a vacuum source communicating with said hopper, a hose communicating at one end with the hopper and communicating at an other end with a suction nozzle having at least one opening for receiving grainy material from a source thereof, whereby grainy material from the source thereof is sucked by action of said vacuum source through said opening of the suction nozzle, through said hose and deposited in said hopper, the improvement comprising:

(1) a pressurized air source;

(2) a supply pipe connected at one end to said pressurized air source and connected at an other end to said suction nozzle; and (3) an annular ejector passage disposed within said suction nozzle on inside surfaces thereof and in communication with said supply pipe, said ejector passage having an annular ejector nozzle therein positioned between said opening and said hose with the ejector nozzle being oriented in a direction toward said hose so that pressurized air ejected therefrom passes from said ejector nozzle in a direction toward inner surfaces of the hose and toward said hopper, whereby blocking of the hose by the grainy material is avoided.

2. A pneumatic conveyor for grainy material as recited in claim 1, wherein the inner surface of the hopper is formed by buffer material.

3. A pneumatic conveyor for grainy material as recited in claim 1, wherein the hose is tangentially mounted on the side wall of the hopper.

4. A pneumatic conveyor for grainy material as recited in claim 1, wherein the ejector nozzle is curved such that a jet stream of pressurized air flows along the inner surfaces of the hose.

5. A suction nozzle for use with the conveyor of claim 1, comprising:
   (1) an elongated nozzle body having an opened end;
   (2) an elongated cap axially slidable on said nozzle body; and
   (3) opening in said cap disposed laterally along said cap, whereby the total openings in said cap which can communicate with said opened end of said nozzle body is adjustable.

6. A suction nozzle for use in a pneumatic conveyor for grainy material as recited in claim 5, wherein the cap has a dual structure consisting of an outer cap and an inner cap so that the outer and inner caps may be relatively rotated to adjust the total opening area.

7. A suction nozzle for use in a pneumatic conveyor for grainy material as recited in claim 5, wherein the suction nozzle is provided at one end with pressured air jet ports from which jet streams of pressurized air are provided to collapse lumps of grainy material.

8. A suction nozzle for use in a pneumatic conveyor for grainy material as recited in claim 5, wherein locations of the suction nozzle corresponding to the respective openings of the cap are provided with air suction perforations.

* * * * *